(12) United States Patent
Kawahashi et al.

(10) Patent No.: US 7,443,060 B2
(45) Date of Patent: Oct. 28, 2008

(54) ACOUSTIC COMPRESSOR WITH TWO RESONATORS

(75) Inventors: Masaaki Kawahashi, Saitama (JP); Mohammed Anwar Hossain, Yokohama (JP); Tamotsu Fujioka, Yokohama (JP)

(73) Assignee: Anest Iwata Corporation (JP)

( * ) Notice: Subject to any disclaimer, the term of this patent is extended or adjusted under 35 U.S.C. 154(b) by 455 days.

(21) Appl. No.: 11/387,650

(22) Filed: Mar. 23, 2006

(65) Prior Publication Data

US 2006/0213720 A1    Sep. 28, 2006

(30) Foreign Application Priority Data

Mar. 25, 2005    (JP)    ............................. 2005-087942

(51) Int. Cl.
*H20K 41/00*    (2006.01)
(52) U.S. Cl. ............................. 310/12; 310/15; 310/13; 310/14; 310/20; 310/36; 310/27; 310/311
(58) Field of Classification Search ................... 310/12, 310/15, 13, 14, 20, 36, 37, 311, 320, 323.06
See application file for complete search history.

(56) References Cited

U.S. PATENT DOCUMENTS

| 3,656,015 | A | * | 4/1972 | Gillum | ........................ | 310/13 |
| 3,890,421 | A | * | 6/1975 | Habozit | ................... | 264/290.2 |
| 5,319,938 | A |   | 6/1994 | Lucas | ............................. | 62/6 |
| 6,876,107 | B2 | * | 4/2005 | Jacobs | ........................ | 310/12 |

FOREIGN PATENT DOCUMENTS

JP    2004-293356    10/2004

\* cited by examiner

*Primary Examiner*—Darren Schuberg
*Assistant Examiner*—Iraj Mohandesi
(74) *Attorney, Agent, or Firm*—Ostrolenk, Faber, Gerb & Soffen, LLP

(57) ABSTRACT

A resonator of an acoustic compressor is provided at each side of an actuator so that the two resonators are arranged side by side. Two pistons are provided at the inner ends of the resonators and actuated by the actuator. At the outer end of the each of the resonators, a gas is introduced into the resonator through a suction hole. When the pistons are actuated by the actuator, the gases in the two resonators are oscillated and compressed by the piston and discharged through discharge holes at the outer ends of the resonators.

14 Claims, 5 Drawing Sheets

ACOUSTIC COMPRESSOR WITH TWO RESONATORS

BACKGROUND OF THE INVENTION

1. Field of the Invention

The present invention relates to an acoustic compressor with two resonators that utilize amplitude pressure fluctuation based on acoustic resonance.

2. Related Art

As disclosed in JP2004-293356A, an acoustic compressor is known in which a piston is made to reciprocate in an axial direction at high speed with a minute amplitude, inside a large diameter base of an acoustic resonator, so as to discharge a fluid sucked in from a small diameter end of the acoustic resonator by pressure fluctuation in the acoustic resonator accompanying reciprocation of the piston.

The acoustic compressor utilizes amplitude pressure fluctuation of acoustic standing waves produced by resonance of a gas column in the tube accompanying motion of the piston when the piston is reciprocated in an axial direction with a minute amplitude, so that, as a moving part, only an actuator is provided for reciprocating, at high speed, the piston provided inside the base of the acoustic resonator.

Accordingly, since the structure is very simple and the risk of malfunctions is small, the acoustic compressor is expected to become widely used.

However, in the acoustic compressor described above, since a gas is sucked in and discharged only by the piston that minutely oscillates, in addition to the fundamental problems that the compression ratio obtained is small and the discharged flow volume is small, the following problems also exist.

(a) Since the actuator protrudes from the base of the acoustic resonator, the dimension of the overall acoustic compressor is large in the axial direction.

(b) Since all of the reaction force of the actuator accompanying generated oscillations must be taken by a supporting member of the actuator, the supporting member must be made strong.

(c) Since the oscillations due to the actuator are transmitted, without change, to the supporting member, there is a risk that the supporting member will be loosened or damaged. As a result, the supporting member must exhibit exceptional oscillation absorption ability, resulting in high costs.

SUMMARY OF THE INVENTION

In view of the disadvantages in the prior art, it is an object of the invention to provide an acoustic compressor with two resonators, having a novel configuration in which capabilities and functions are exceptionally improved.

DETAILED DESCRIPTION OF PREFERRED EMBODIMENTS

Figure 1:
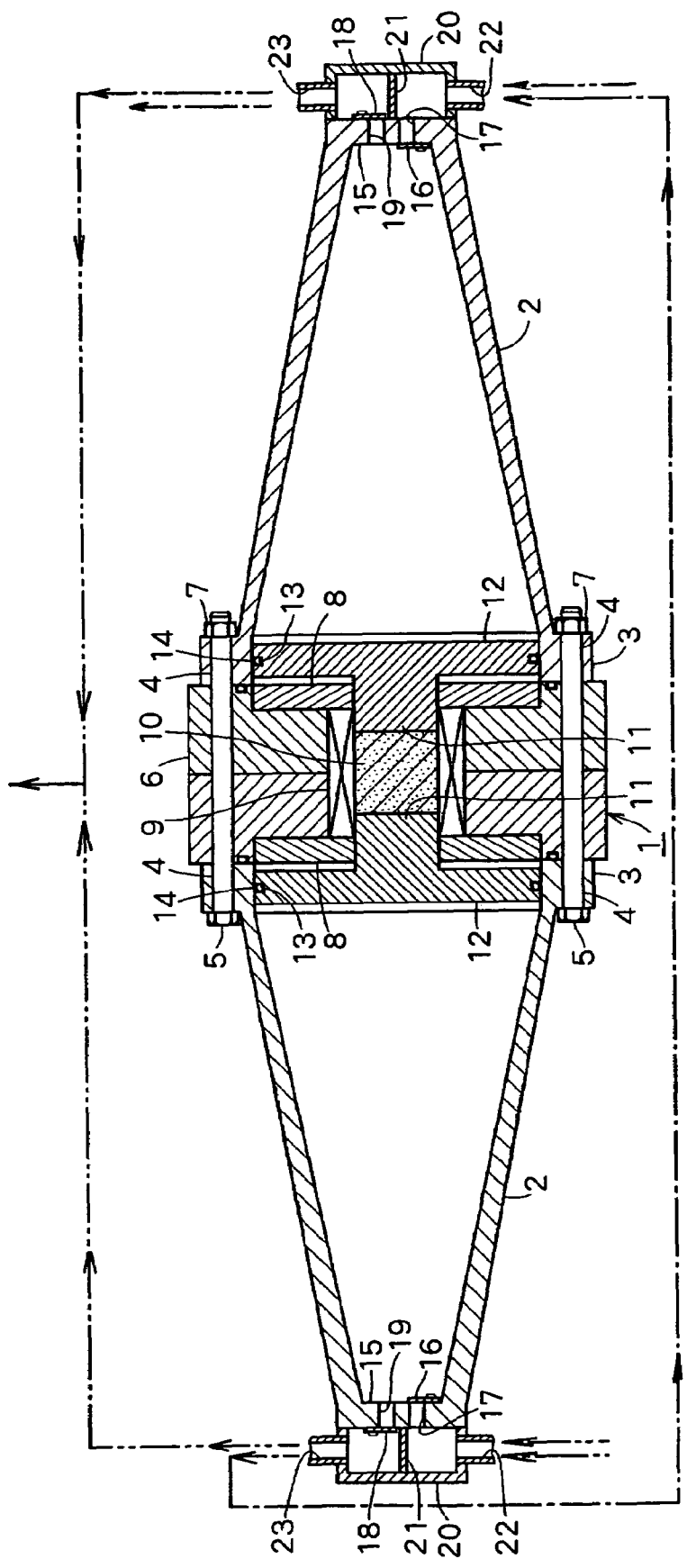
FIG. 1 is a longitudinal sectional front view showing the first embodiment of an acoustic compressor with two resonators according to the present invention.

FIG. 1 is a longitudinal sectional front view showing the first embodiment of an acoustic compressor with two resonators according to the present invention.

Outward flanges 3 provided at large diameter base portions at the inner ends of horizontal conical acoustic resonators 2, in which respective end portions have smaller diameters, are in contact with right and left sides of a linear-motor-type actuator 1, and by pushing fastening bolts 5, inserted into a plurality of horizontal fixing holes 4 arranged in the outward flanges 3, through a base frame 6 on the actuator 1, and tightening them with nuts 7, the acoustic resonators 2 are fixed to the two sides of the actuator 1

In the actuator 1, a horizontal cylindrical coil 9, concentric with the base frame 6, is provided between the inner circumferences of annular bearing plates 8 provided on each face of the base frame 6, and a rodlike magnet 10 having minute voids, and sliding shafts 11 bonded to both side faces thereof are fitted to the inside of the cylindrical coil 9.

The base frame 6 is divided into two portions, right and left, for reasons of manufacture and assembly. The same applies to the figures below.

Each sliding shaft 11 passes through the bearing plates 8 that are axial, and extends in an outward direction; and disc-shaped pistons 12 extend on the outer ends of the sliding shafts 11. The pistons 12 are slidably fitted, preserving air-tightness, inside the larger-diameter bases of the acoustic resonators 2, and O-rings 14 are fitted into annular grooves 13 in the outer circumferential surfaces of the pistons 12.

A suction hole 17 provided with a check valve 16 for sucking external air to the inside, and a discharge hole 19 provided with a check valve 18 for discharging pressurized gas to the outside, are arranged at small diameter external end walls 15 at the outer ends of the acoustic resonators 2.

On the outer side of each external end wall 15, a cylinder cover 20 covering the suction hole 17 and the discharge hole 19 is fixed, and the suction hole 17 and the discharge hole 19 are separated by a partition wall 21 inside the cylinder cover 20.

On the side wall of the cylinder cover 20, an inlet hole 22 that communicates with the suction hole 17, and an outlet hole 23 that communicates with the discharge hole 19 are arranged.

Shape, dimensions, and the structure of attached elements of the acoustic resonators 2 on both right and left sides are the same.

If an electric current passes through the actuator 1, the rodlike magnet 10 oscillates minutely at a high speed in an axial direction; when the pressure amplitude inside each acoustic resonator 2 becomes extremely small, external air is sucked into the acoustic resonator 2 by the suction hole 17 that has the check valve 16; and when the pressure amplitude inside the acoustic resonator 2 becomes very large, discharge takes place in a pressurized state, by the discharge hole 19 that has the check valve 18.

In this way, since the two acoustic resonators 2, right and left, can be activated at the same time by the one actuator 1, an economical solution is realized, and the extent to which oscillations generated by the actuator 1 are transmitted to the external supporting member or the like is small.

For example, as shown by the dotted and dashed line in FIG. 1, if the discharge hole 19 of the acoustic resonator 2 on the left is connected to the suction hole 17 of the acoustic resonator 2 on the right, high pressure compressed gas can be obtained.

Similarly in FIG. 1, as shown by the chain double-dashed line, if the two discharge holes 19 of the acoustic resonators 2 on the right and left are connected and discharging is carried out, a large volume of compressed gas can be obtained.

Figure 2:
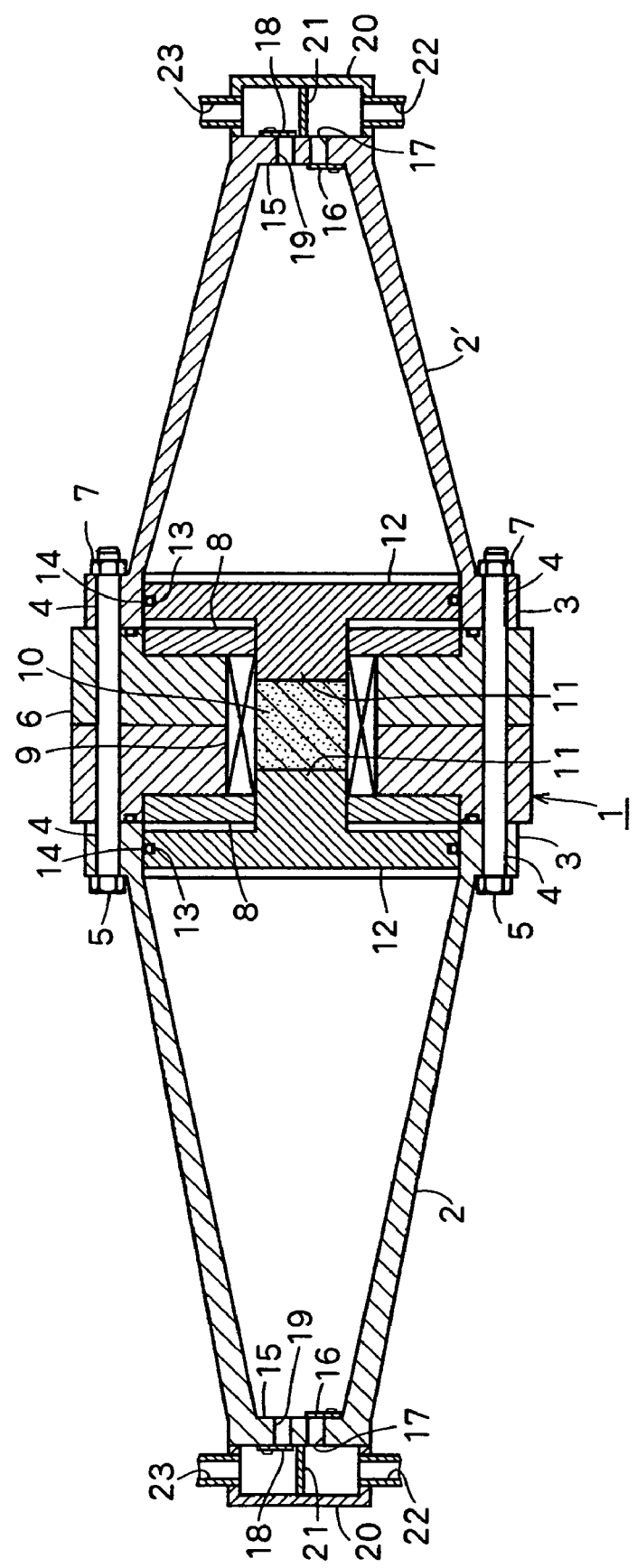
FIG. 2 is a longitudinal sectional front view showing the second embodiment of the present invention.

FIG. 2 is a longitudinal sectional front view similar to FIG. 1, showing the second embodiment of an acoustic compressor according to the present invention. Elements that are the same as those in FIG. 1 are denoted with the same numerals and explanations thereof are omitted.

With respect to the embodiment shown in FIG. 1, a right side acoustic resonator 2' has a dimension shorter than that at the left side, and the shapes are different.

In this way, the pressure or the volume of gas discharged from the right and left acoustic resonators 2 and 2' is different.

Figure 3:
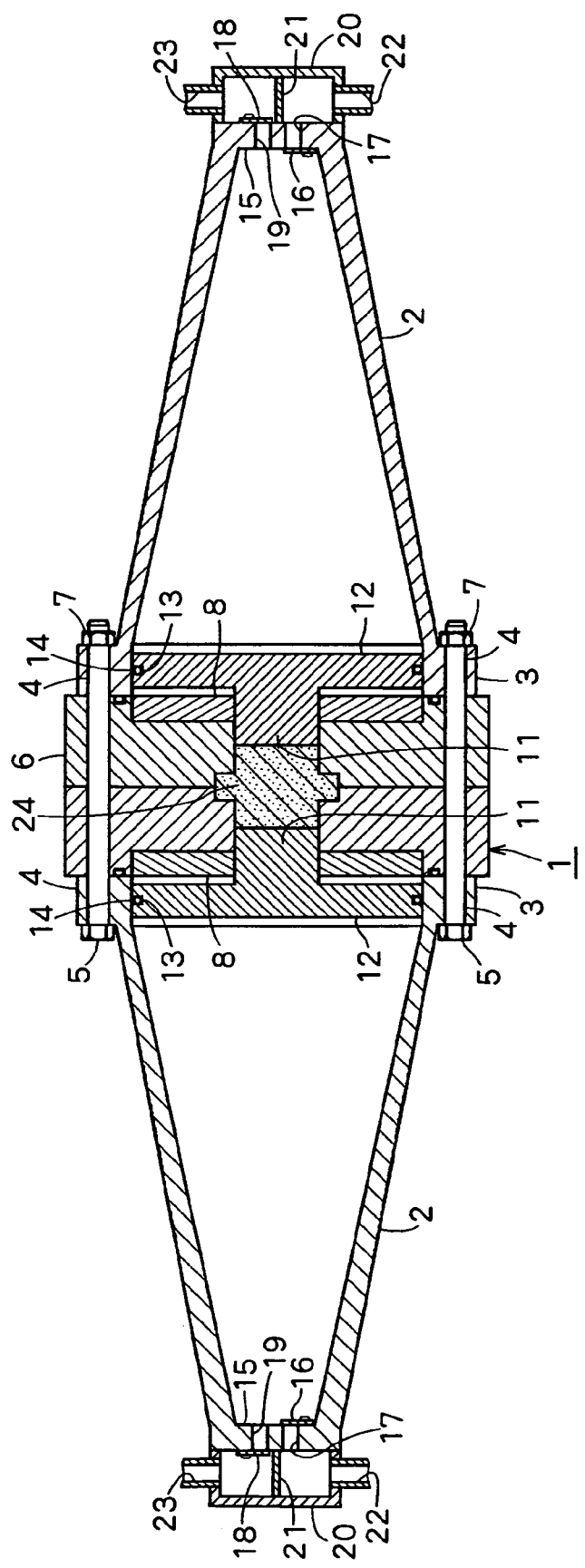
FIG. 3 is a longitudinal sectional front view showing the third embodiment of the present invention.

FIG. 3 is a longitudinal sectional front view similar to FIG. 1 showing the third embodiment of an acoustic compressor according to the present invention. Elements that are the same as those in FIG. 1 are denoted by the same numerals and explanations thereof are omitted.

The cylindrical coil 9 of FIG. 1 is omitted, and instead of the rodlike magnet 10, a piezoelectric element 24 is arranged between sliding shafts 11 that are integrated with pistons 12.

The piezoelectric element 24 is pushed through and firmly fixed to a base frame 6, and an inner end face of each slider shaft 11 is bonded or fixed to an outer end face of the piezoelectric element 24.

Figure 4:
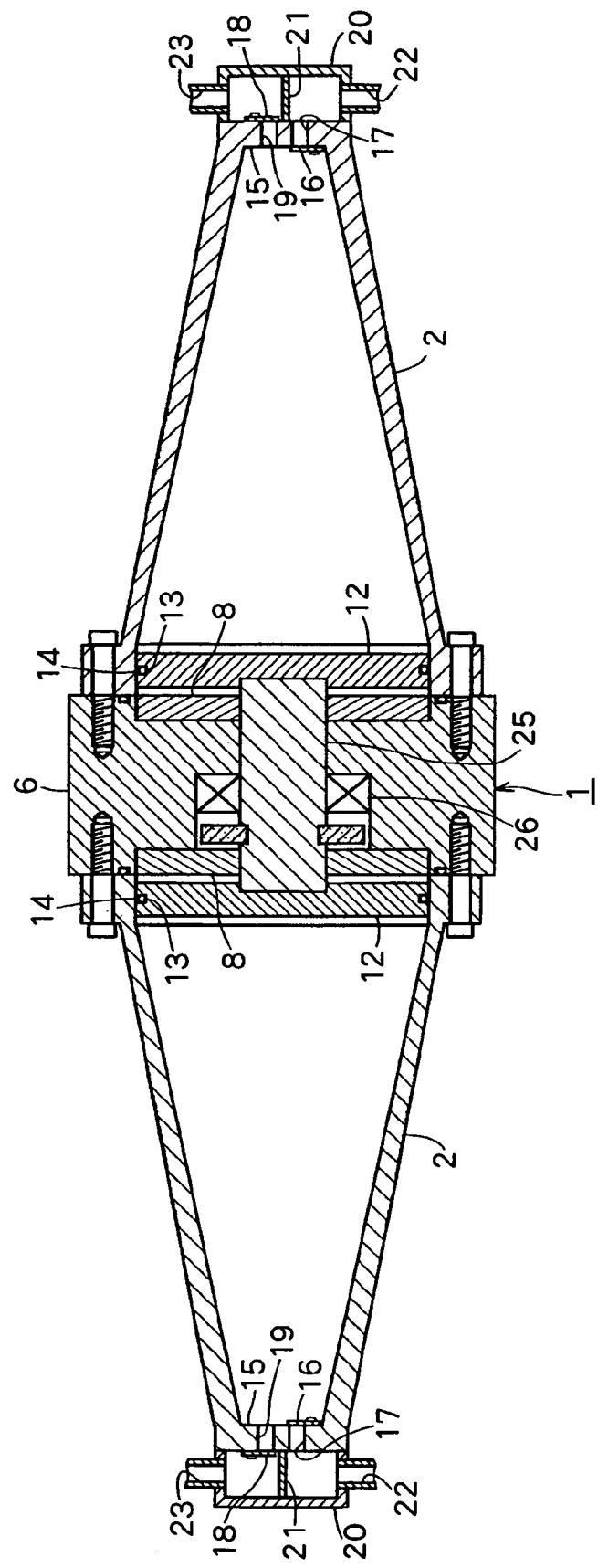
FIG. 4 is a longitudinal sectional front view showing the fourth embodiment of the present invention.

FIG. 4 is a longitudinal sectional front view similar to FIG. 1 showing the fourth embodiment of an acoustic compressor according to the present invention. Elements that are the same as those in FIG. 1 are denoted with the same numerals and explanations thereof are omitted.

With respect to FIG. 1, a connecting shaft 25 linking the right and left pistons 12 is made to oscillate in an axial direction by a linear motor or a piezoelectric element 26.

Figure 5:
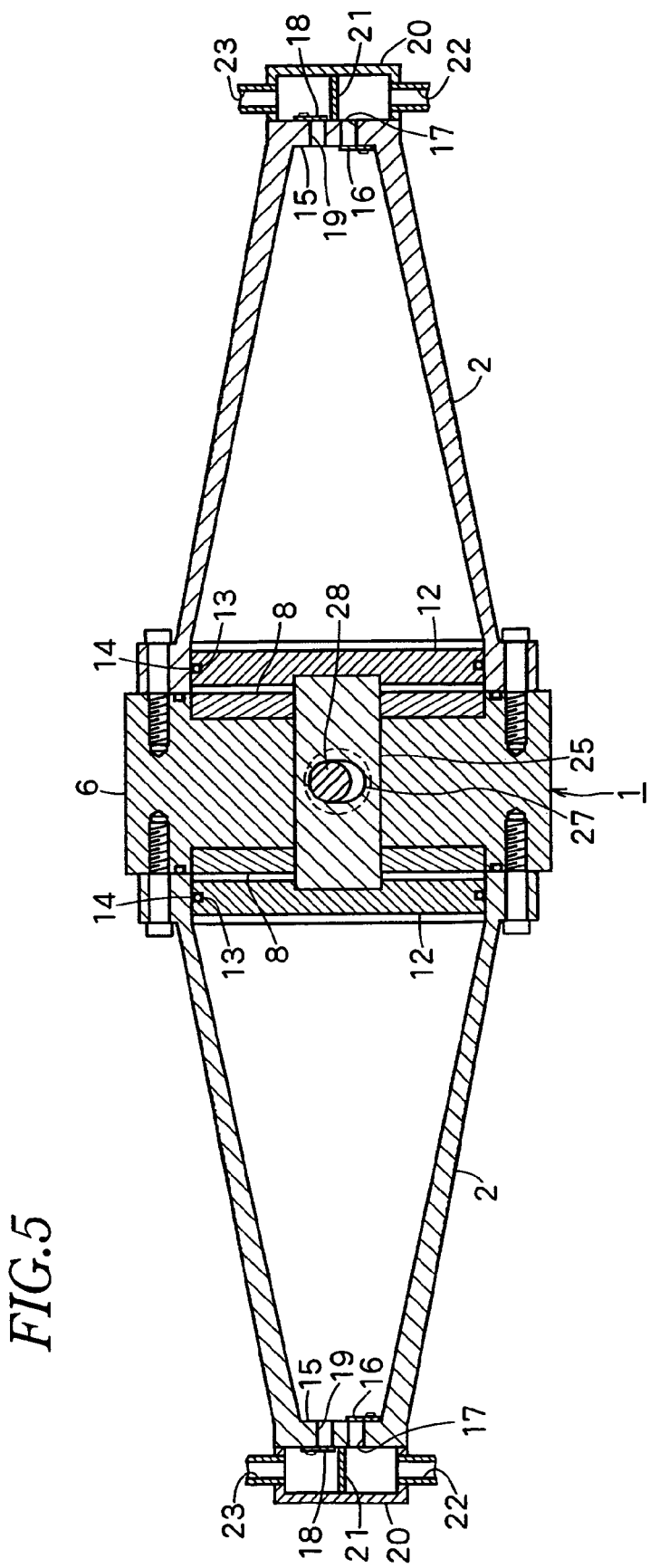
FIG. 5 is a longitudinal sectional front view showing the fifth embodiment of the present invention.

FIG. 5 is a longitudinal sectional front view similar to FIG. 1 showing the fifth embodiment of an acoustic compressor according to the present invention. Elements that are the same as those in FIG. 1 are denoted with the same numerals and explanations thereof are omitted.

An elongate hole 27 is formed in a connecting shaft 25 shown in FIG. 4, perpendicular to the axis thereof, and a crankshaft 28 that is made to rotate eccentrically is fitted in the elongate hole 27.

The foregoing merely relates to embodiments of the invention. Various modifications and changes may be made by a person skilled in the art without departing from the scope of claims wherein:

What is claimed is:

1. An acoustic compressor comprising:
    two resonators arranged side by side and having a coaxial axis, each of the resonators having an inner end and an outer end;
    an actuator between the inner ends of the two resonators;
    suction holes each of which is formed on the outer end of each of the resonators to suck a gas into each of the resonators;
    pistons each of which is provided between the inner end of the resonator and the actuator to oscillate and compress the gas in each of the resonators reciprocally along the coaxial axis by the actuator; and
    discharge holes each of which is formed on the outer end of each of the resonators to discharge the compressed gas.

2. An acoustic compressor as claimed in claim 1 wherein the actuator comprises a rodlike magnet, a cylindrical coil that surrounds the rodlike magnet and sliding shafts bonded to side faces of the rodlike magnet.

3. An acoustic compressor as claimed in claim 2 wherein the sliding shaft is integrally formed with the piston.

4. An acoustic compressor as claimed in claim 2 wherein an electric current passes through the rodlike magnet to allow the magnet to oscillate axially, the gas being sucked into the resonator via the suction hole when pressure amplitude in each of the resonators decreases extremely, while the gas is discharged through the discharge hole when pressure amplitude in each of the resonators increases extremely.

5. An acoustic compressor as claimed in claim 1 wherein the resonators are arranged horizontally.

6. An acoustic compressor as claimed in claim 1 wherein each of the resonators is tapered towards the outer end.

7. An acoustic compressor as claimed in claim 1 wherein one of the resonators has the same size as the other.

8. An acoustic compressor as claimed in claim 1 wherein one of the resonators is different in length from the other.

9. An acoustic compressor as claimed in claim 1 wherein the actuator comprises a linear motor.

10. An acoustic compressor as claimed in claim 1 wherein the actuator comprises a piezoelectric element.

11. An acoustic compressor as claimed in claim 1 wherein the actuator comprises a pin-crank-type.

12. An acoustic compressor as claimed in claim 1 wherein the pistons are connected to each other by a connecting shaft which is vibrated reciprocally in an axial direction.

13. An acoustic compressor as claimed in claim 1 wherein the discharge hole of one of the resonators is connected to the suction hole of the other of the resonators to obtain a high-pressure compressed gas.

14. An acoustic compressor as claimed in claim 1 wherein the discharge hole of one of the resonators is connected to the discharge hole to obtain a high-volume compressed gas.

* * * * *